US008521489B2

(12) United States Patent
Faure

(10) Patent No.: US 8,521,489 B2
(45) Date of Patent: Aug. 27, 2013

(54) METHOD AND DEVICE FOR CONTACT SIMULATION USING LAYERED DEPTH IMAGES

(75) Inventor: Francois Jean Roger Faure, Crolles (FR)

(73) Assignee: Universite Joseph Fourier, Grenoble (FR)

( * ) Notice: Subject to any disclaimer, the term of this patent is extended or adjusted under 35 U.S.C. 154(b) by 493 days.

(21) Appl. No.: 12/866,046

(22) PCT Filed: Feb. 4, 2009

(86) PCT No.: PCT/FR2009/050170
§ 371 (c)(1),
(2), (4) Date: Aug. 4, 2010

(87) PCT Pub. No.: WO2009/101327
PCT Pub. Date: Aug. 20, 2009

(65) Prior Publication Data
US 2010/0318332 A1    Dec. 16, 2010

(30) Foreign Application Priority Data
Feb. 4, 2008    (FR) ..................... 08 50693

(51) Int. Cl.
*G06G 7/48*      (2006.01)
(52) U.S. Cl.
USPC ............................................. 703/6
(58) Field of Classification Search
USPC ............................................. 703/6
See application file for complete search history.

(56) References Cited

PUBLICATIONS

Hirota G et al: "An implicit finite element method for elastic solids in contact", Computer Animation, 2001. The Fourteenth Conference on Computer Animation Proceedings Nov. 7-8, 2001, pp. 136-146, Iscataway,NJ, USA, IEEEXP010576635.
Heidelberger B et al: "Real-Time Volumetric Intersections of Deforming Objects", Proceedings of the Vision, Modeling, and Visualization Conference 2003 (VMV 2003), Nov. 19-21, 2003, pp. 461-468, XP002495015.
Terzopoulos D: "Elastically Deformable Models", Computer Graphics, Jul. 1, 1987, pp. 205-214, vol. 21, No. 4, XP000677031.
Faure Fetal: "Image-based Collision Detection and Response between Arbitrary Volume Objects", [Online], Jul. 2008, Retreived Sep. 9, 2008 From: URL:http://www-ljk.imag.fr/Publications/Basilic/com.lmc.publi.PUBLI_Inproceedings@lla3a80d87d_19a02ge/main.pdf>, XP002495016.
Teschner et al: "Collision detection for deformable objects" Computer Graphics Forum24, Mar. 1, 2005, 61-81.
French Search Report, Dated Sep. 9, 2008, in French Application FR 0850693.
International Search Report, Dated Aug. 21, 2009, in PCT/FR20009/050170.

*Primary Examiner* — Saif Alhija
(74) *Attorney, Agent, or Firm* — Young & Thompson

(57) ABSTRACT

A method for the interactive simulation of an intersection between at least two volumetric objects modelled using geometric primitives. The method first includes applying a Layered Depth Image (LDI) algorithm along a first display axis in order to determine a set of contact pixels. The method further includes: —calculating an intersection volume (V) from the contact pixels; —at each summit of the geometric primitives, calculating a partial derivative of the size of the intersection volume (V) relative to the coordinate of the summit along the projection axis; repeating the preceding steps for the two other orthogonal display axes in order to determine a vector containing the partial derivatives of the size of the volume relative to the coordinates of each of the summits; and—at each summit, associating a force f calculated from the partial derivatives.

16 Claims, 4 Drawing Sheets

METHOD AND DEVICE FOR CONTACT SIMULATION USING LAYERED DEPTH IMAGES

BACKGROUND OF THE INVENTION

1. Field of the Invention

Figure 1:
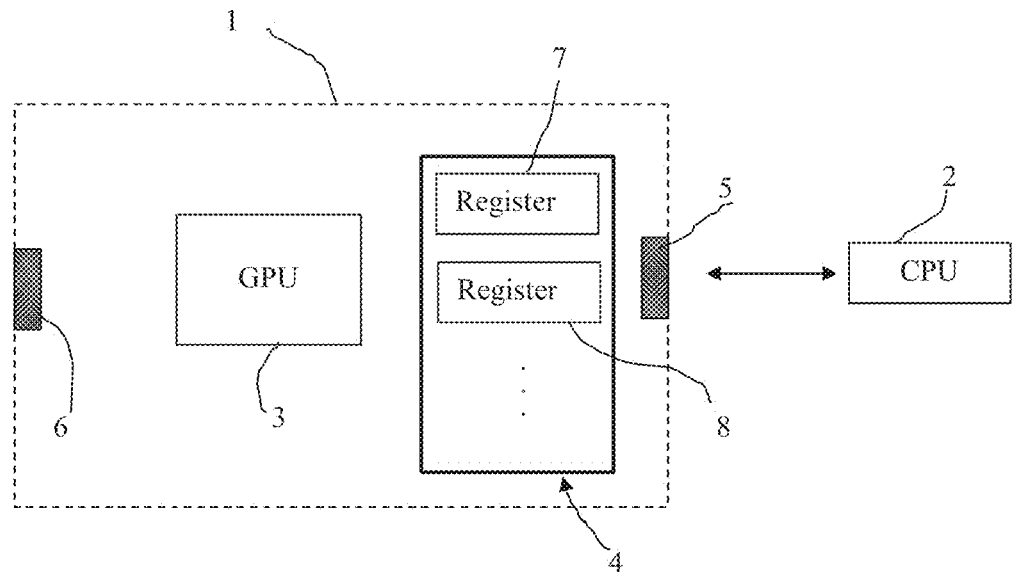

The present invention relates to a method for simulating contact between at least two volumetric objects delimited by triangular surfaces.

It finds a particularly useful application in the field of real-time to physical simulation for video games or surgical simulators. But it is of a broader scope since it can be applied to any simulation involving objects in contact with a non-trivial geometry.

2. Description of the Related Art

Simulation of mechanical objects can be broken down schematically into four main processes: collision detection, calculation of contact forces, calculation of internal forces, and time integration. Collision detection is often the most intensive processing operation and has been the subject of extensive detailed investigation for many years. This processing is important since the credibility of the simulation depends on it.

Precise geometric tests and in-depth calculations of intersection are necessary for determining forces of interaction between contact surfaces. The objects are generally broken down into contact primitives such as spheres or triangles. However, spherical primitives lead to rather unconvincing approximations of the contact surface and unfortunately give rise to substantial artefacts. Primitives based on triangles are more effective but require more geometric calculations than spheres. In any case, calculations of the repulsive forces are complex in application and discontinuous space functions may appear. For rigid objects, it is possible to carry out calculations beforehand in order to avoid these discontinuous functions, but this is difficult to envisage for deformable objects. Collision detection and the calculation of contact forces are therefore still extremely difficult tasks.

In the prior art there is the document of Teschner et al., "Collision detection for deformable objects." Computer Graphics Forum 24, 1 (March 2005), 61-81, which describes collision detection and response techniques. This document describes techniques for creating bounding volume hierarchies to overcome the quadratic complexity inherent in collision detection. This document uses the distance field technique to obtain robust collision detection. In this technique, for any point in space, the "closest feature" is stored, being the surface element closest to this point, so as to permit deep intersections. In practice, this technique is only used for rigid objects as it requires previous calculations (preprocessing) of distance fields during initialization of the simulation. There are also still problems of discontinuity in the application of a 3D space to a surface, which can generate unstable responses.

In general, existing data processing systems, such as personal computers, include a graphics card which has the function of handling the processing and display of graphics components of ever increasing complexity. This graphics card in particular makes it possible to speed up 3D display. To do this, it includes a graphics processing unit (GPU), which is a processor optimized for 3D.

Recently, to exploit the computing power of GPUs and their capacity for efficient sampling of polygons, image-based methods were introduced. For given mesh geometries, these methods generate pairs of geometric primitives, which are then processed by the CPU for calculating the contact forces. As they do not use volumetric data structures, they can be applied effectively to rigid objects and deformable objects. The pairs of contacts can be composed of triangles or of points in volumes. After detection, additional calculations by the CPU are required for modelling the intersections and the contact forces.

The document by Heidelberger et al. "Real-time volumetric intersections of deforming objects", in Proceedings of Vision, Modeling, Visualization (VMV), Munich, Germany, Nov. 19-21, 2003, which describes a layered depth image (LDI) algorithm, is known. This algorithm provides compact representation of several layers of the geometry of an intersection of objects from a given viewpoint. This algorithm makes it possible to construct geometric models of the intersection volume. According to this algorithm, the bounding boxes of the objects are calculated. Then, for each pair of potentially colliding objects, a visualization axis is selected and the entire surface of each object is rendered in a variety of textures (LDI). The surfaces contained in the intersection of the bounding boxes are visualized, said visualization being extended in the direction of visualization so as to include all the surface layers. Collision detection is then carried out taking into account consecutive pairs of texels (texture pixels), or triplets for self-collision, along the visualization axis. This quick and simple method avoids preprocessing operations. However, this document only deals with collision detection and says nothing about calculation of the contact forces.

SUMMARY OF THE INVENTION

The purpose of the present invention is to remedy the aforementioned drawbacks in particular by limiting the complex geometric calculations.

Another purpose of the invention is a method for quickly calculating the contact forces of rigid and deformable simulated objects, without requiring geometric preprocessing.

At least one of the aforementioned objectives is achieved with a method of interactive simulation of an intersection between at least two volumetric objects modelled by means of geometric primitives, in particular triangular surfaces. This method comprises the following stages:

a) a bounding polyhedron of an intersection volume between the two objects is determined, b) for a given visualization axis of the polyhedron, an algorithm of the layered depth images (LDI) is applied, so as to determine a set of contact pixels; these pixels being surface elements of the intersection volume of the simulated objects.

According to the invention, in addition the following stages are carried out:

c) the size (in cubic meters) of the intersection volume is calculated from the contact pixels, d) at each vertex of the geometric primitives in the polyhedron, a partial derivative of the size of the intersection volume V with respect to its coordinate on the visualization axis is calculated, e) at least stages b) and d) are repeated for two other orthogonal visualization axes so as to determine partial derivatives with respect to three orthogonal axes, thus obtaining a gradient vector, and f) a force f calculated from said partial derivatives is associated with each vertex of the geometric primitives of the objects.

These stages are executed under static conditions, and there is no temporal integration.

The two objects can be two parts of one and the same entity, so that self-collision can be processed.

With the method according to the invention, the LDI algorithm is used for modelling the contact surfaces in the form of height fields sampled in three orthogonal directions. Pressure forces acting on the contact surface can then be calculated according to the partial derivatives of the intersection volume in the three directions. No document of the prior art describes implementation of the LDI algorithm on three orthogonal axes and calculation of the force from the partial derivatives of the intersection volume. These partial derivatives can be calculated advantageously from images created within a graphics card. Consequently, standard graphics hardware can be used, such as a graphics card of a personal computer, for calculating the contact forces between simulated objects.

The present invention is an image-based method which is capable of directly calculating the components of the contact forces that are applied at the vertices of triangles. More precisely, the LDI algorithm is extended by devising a new geometric model based on pixels. Not only to the intersection volume is modelled, but also its derivative with respect to the coordinates of the vertices. Deep intersections can then be taken into account efficiently while avoiding complex geometric calculations.

Moreover, the polyhedron is defined as a volume resulting from the intersection between two bounding boxes of the two objects respectively.

Preferably, it is a rectangular parallelepiped, the three visualization axes being three orthogonal axes of this rectangular parallelepiped.

Calculation of the forces is independent of the internal dynamics of the objects and the surfaces can be attached to various physical models.

According to the invention, in stage b), each contact pixel can be associated with:
- a height value,
- an identifier of the geometric primitive associated with this pixel,
- an identifier of the object to which this pixel belongs,
- an orientation of the normal to the geometric primitive associated with this pixel, and
- barycentric coordinates on the geometric primitive associated with this pixel.

The intersection volume V can be calculated in various ways. One embodiment example is to use rectangles to model the surface defined by the intersection volume viewed along the visualization axis (this corresponds to a sectional view of the intersection volume). In this case, in stage c), the intersection volume V is calculated from the following equation:

$$V = a \sum_{(i,j) \in C} (-1)^d z_{i,j},$$

"a" being the area of a pixel; "C" is a set of indices of pixels that cover the surface of the intersection volume; $z_{i,j}$ is the height of the contact pixels; "d" is equal to 2 or to 1 depending on whether it is an upper pixel or a lower pixel, this concept of upper or lower pixel being defined in the LDI algorithm. In fact, in the height field representation, a collision involves a pair of pixels, an upper pixel and a lower pixel; "d" is equal to 2 for the upper pixel, and "d" is equal to 1 for is the lower pixel.

According to the invention, for calculating the force it is assumed that the repulsive forces tend to minimize the intersection volume. A potential energy E associated with the intersection volume V is therefore defined. Advantageously, in stage f), the force can be defined by the following equation:

$$f = -\frac{\partial E}{\partial x},$$

x being a vector of vertex coordinates.

Advantageously, this energy E is an increasing function of the intersection volume V. The corresponding force is therefore proportional to the gradient of the volume. The potential energy E can for example be defined by the following equation:

$$E = \frac{1}{2} k V^2,$$

obtaining $$f = -kV \frac{\partial V}{\partial x},$$

k being a positive number.

The repulsive forces are parallel to the normal to the triangles and proportional to their area since the volume gradient (partial derivative of the volume) indicates the direction of maximum variation of the volume. The forces can be interpreted as being the sum of the pressure forces integrated over the surface of the intersection volume.

According to an advantageous feature of the invention, the partial derivative of the intersection volume with respect to the z coordinate of a vertex A on the axis of the LDI is defined by the following equation:

$$\frac{\partial V}{\partial z} = a \sum_{(i,j) \in C} (-1)^d \frac{\partial z_{i,j}}{\partial z}$$

It should be noted that the term $$\frac{\partial z_{i,j}}{\partial z}$$

in fact corresponds to the Gouraud (barycentric) shading coefficient, generally used for interpolating the height and the colour of a pixel (i, j).

According to an advantageous embodiment of the invention, stage c) is also repeated in stage e), the intersection volume V to be considered for the next stages being ⅓ of a value obtained by summing the intersection volume calculated at each repetition. This technique makes it possible to approximate the exact value of the intersection volume with its mean value on the three visualization axes.

Advantageously, the device can further comprise at least one volume register for storing calculated values of intersection volume, and a gradient register comprising a vector containing three scalar values per vertex, each associated with a visualization axis.

According to one embodiment of the invention, for an interactive dynamic simulation, a stiffness matrix can be used for encoding the variation of the forces in response to the variation of the positions of the vertices. This stiffness matrix can be determined by calculating a differential of the force f, and approximated according to the following formula if starting from a preceding equation:

$$\frac{\partial f}{\partial x} = -\frac{\partial V}{\partial x} k \frac{\partial V^T}{\partial x}$$

According to another aspect of the invention, a device is proposed for interactive simulation of an intersection between at least two volumetric objects modelled by means of geometric primitives. According to the invention, this device comprises a graphics processing unit GPU implementing a method such as described previously to calculate the contact forces.

The device can be a global machine alongside the graphics processing unit GPU as well as a central processing unit CPU that can recover images calculated by the graphics processing unit and deduce from them the forces to be applied on the two objects.

BRIEF DESCRIPTION OF THE DRAWING FIGURES

Figure 2:
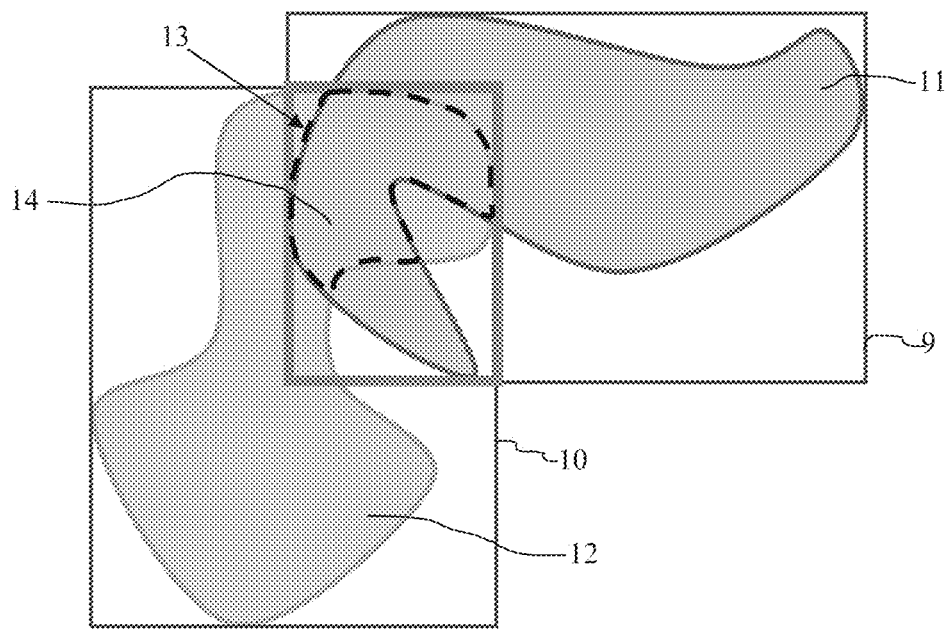
Figure 3:
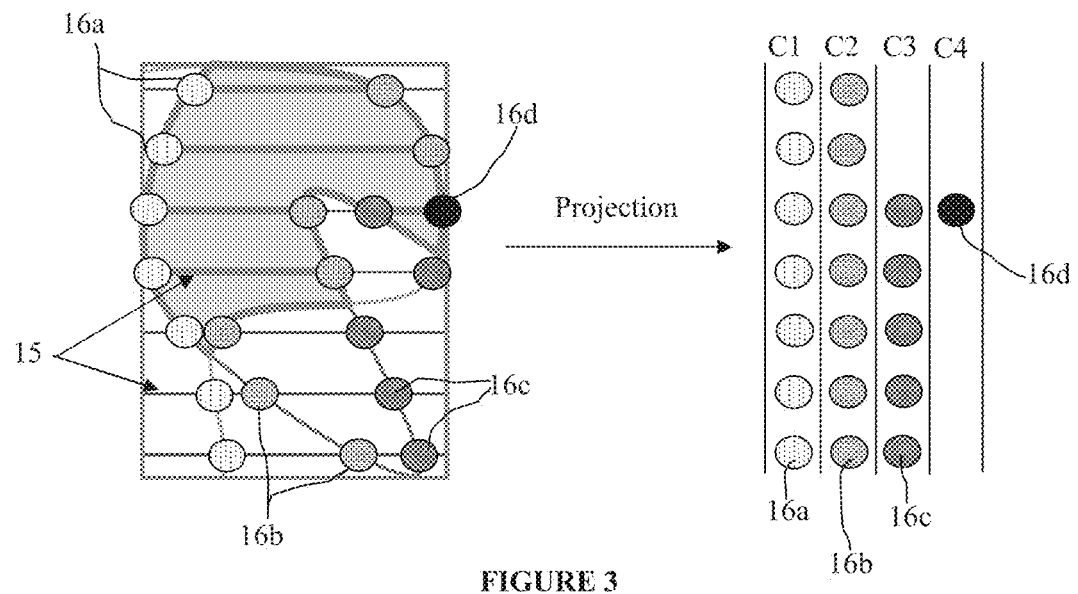
Figure 4:
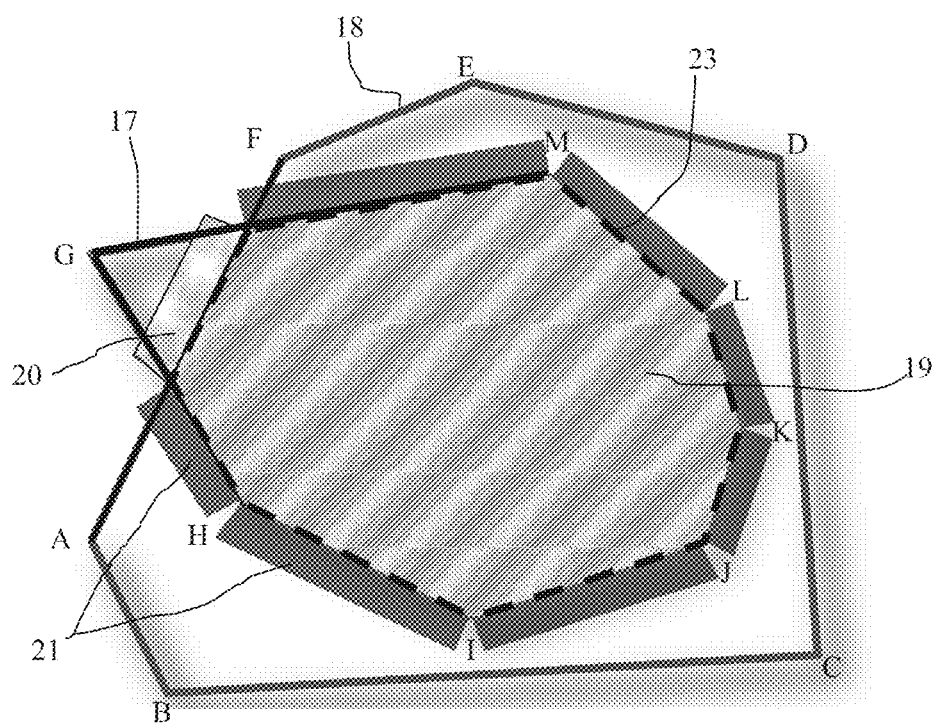

Other advantages and characteristics of the invention will become apparent on examining the detailed description of one embodiment, which is in no way limitative, and the attached drawings, in which:

FIG. 1 is a simplified general view of a graphics processing unit that communicates with a CPU, FIGS. 2 and 3 illustrate stages in application of the LDI algorithm, and FIGS. 4 to 7 are simplified views in two dimensions of two intersecting objects at different stages of the method according to the invention for calculating contact forces.

DETAILED DESCRIPTION OF THE INVENTION

As a non-limitative example, the present invention can be used within a graphics processor GPU intended for creating pixels from triangular surfaces. FIG. 1 shows, very schematically, a graphics card 1 communicating with a CPU processor 2. The graphics card is in particular provided with a graphics processor GPU 3, a memory zone 4 and connectors 5, 6 for communicating with the CPU 2 and a display means (not shown). In this memory zone 4 there is in particular a volume register 7 for storing calculated values of intersection volume and a gradient register 8 for storing a vector containing the partial derivatives with respect to each vertex of a triangular surface according to the invention. These registers 7, 8 can also be in RAM memory on the CPU side.

Preferably, the graphics card executes the LDI algorithm, the output data from which are recovered and then processed by the processor CPU for the rest of the operations according to the invention.

Similarly, the entire method according to the invention can also be executed on the processor CPU directly.

The LDI technique applied to two intersecting objects will now be described, referring to FIGS. 2 and 3. To begin, a bounding box 9, 10 is defined around each object 11, 12. Then a rectangular parallelepiped 13 is identified, which is the intersection between the two bounding boxes 9 and 10. This rectangular parallelepiped 13 contains the intersection volume, which is the volume filled by a part of object 11 and a part of object 12. The intersection volume 14 is represented by the dashed line in FIG. 2.

Initially, the objects 11 and 12 are simulated in three dimensions. In FIG. 2, however, a visualization axis has been chosen so that the objects 11 and 12 are represented in two dimensions. In the rectangular parallelepiped 13, the contact surfaces are represented by the lines delimiting the objects 11 and 12. Then these surfaces contained in the plane of FIG. 2 are sampled. Said sampling can be seen in FIG. 3: it is a regular sampling, each sample or pixel being determined as the crossing point between a horizontal straight line and a line (or surface) contained in the rectangular parallelepiped 13. FIG. 3 shows a plurality of these horizontal straight lines 15 which cross the lines delimiting the objects 11 and 12 as samples or pixels 16a-16d. Then, a projection of these pixels 16a-16d is carried out in a horizontal direction. The surfaces are then represented as height fields. As several surfaces may be projected on one and the same point, several layers are used. The first layer c1 is constituted by first-order samples 16a: that is, samples obtained from a first crossing between each horizontal straight line 15 and a line in the rectangular parallelepiped 13. Layer c2 contains the second-order samples 16b corresponding to the second crossing between each horizontal straight line 15 and the lines within the rectangular parallelepiped 13. The same applies to layer c3 containing samples 16c and layer c4 containing the single sample 16d (obtained from a single line 15 that crosses, for the fourth time, a surface in the rectangular parallelepiped 13). The contact pixels are the samples delimiting the intersection volume 14.

Each sample contains its height, an identifier of the associated geometric primitive, an identifier of the object to which it belongs, an orientation of the normal to the associated geometric primitive, and barycentric coordinates on the associated geometric primitive.

The next figures show in greater detail the manner of calculating and applying the contact forces.

FIGS. 4 to 7 show another example of intersection between two objects 17 and 18. Object 17 is contained almost entirely in object 18. Each object is modelled according to triangular primitives and vertices A to M can be discerned, which are in fact the vertices of the polygons representing objects 17 and 18 in FIGS. 4 to 7. The intersection volume 19 is illustrated by a polygon drawn with a dashed line 23 delimited predominantly by the surface of object 17 and by one edge of object 18. This dashed line 23 represents the contact surfaces between the two objects. Zones 20 and 21 illustrate the contact forces. Zone 20 represents the contact force applied by object 18. Zones 21 represent the contact forces applied by object 17. According to the present invention, the LDI algorithm will be applied to the intersection of objects 17 and 18 along three visualization axes or orthogonal projection axes. To simplify the disclosure, FIGS. 5 and 6 only illustrate the projections along two orthogonal axes: horizontal in FIG. 5, vertical in FIG. 6.

Figure 5:
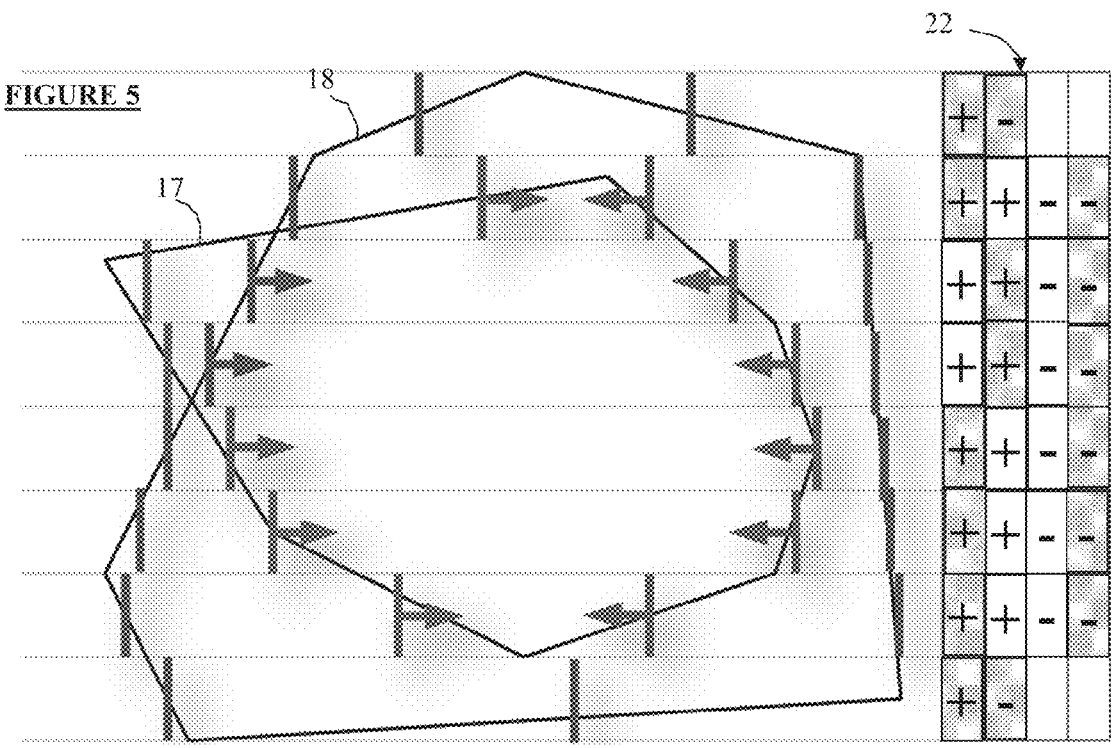
Figure 6:
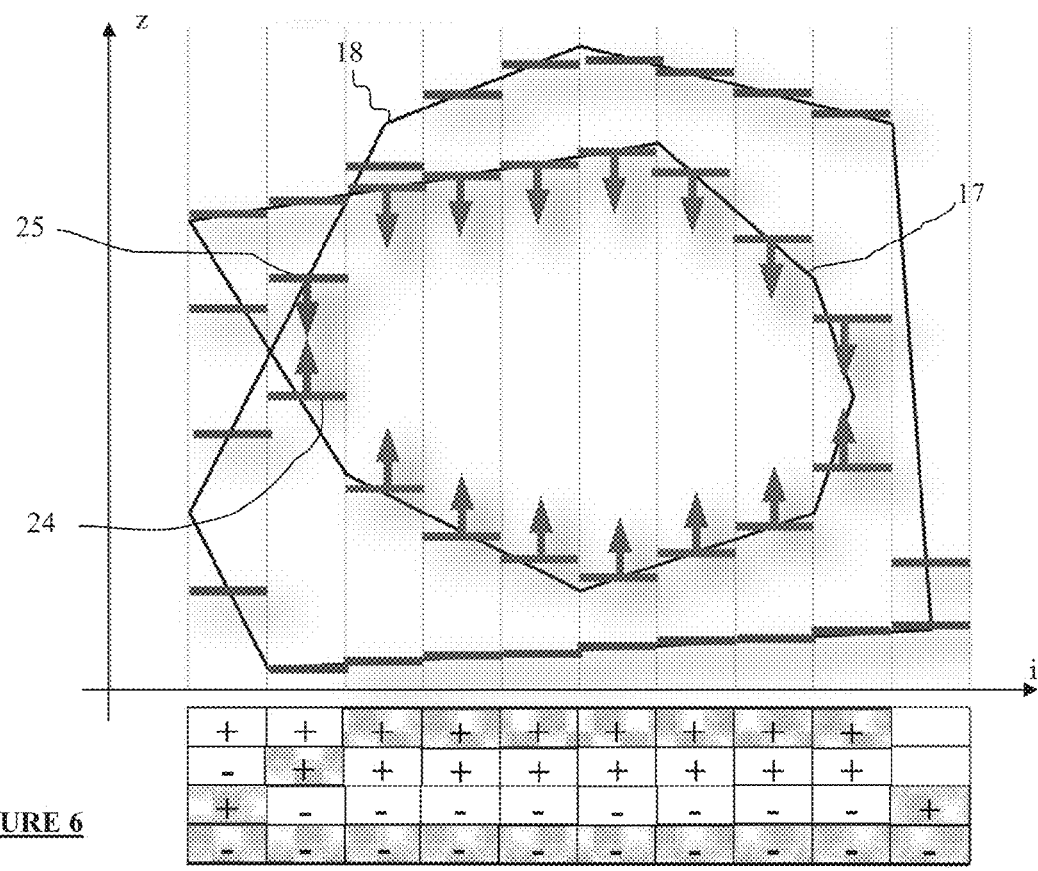
Figure 7:
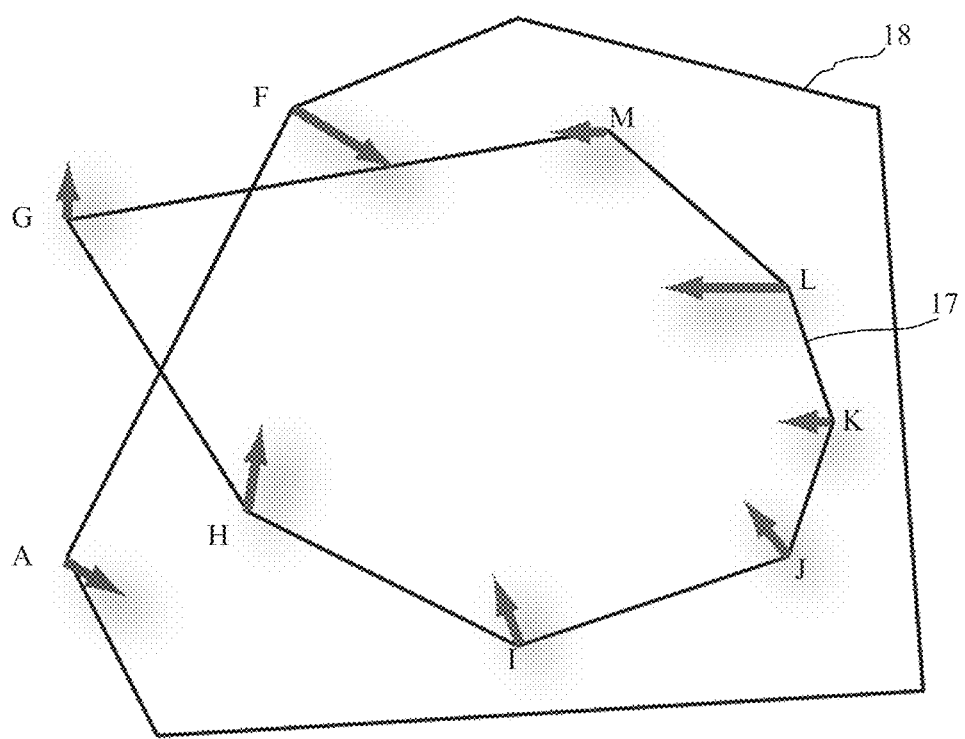

FIG. 5 shows a sampling of the surfaces in the vertical direction. Each line is a pixel. Sampling is carried out along horizontal channels. Box 22 is a representation as height fields, i.e. in the form of layers of pixels sampled on the surfaces of the two objects 17 and 18. The "+" and "−" signs in box 22 correspond to the direction of the repulsive pressure on the corresponding pixel. Box 22 assists in identifying the intersections between objects and in identifying the contact pixels, i.e. the pixels of the contact surfaces. In FIGS. 5 and 6, the contact pixels each bear an arrow representing the repulsive pressure. FIG. 6 illustrates a vertical projection. In the same way as in FIG. 5, the pixels obtained after sampling are represented by short lines, but this time they are horizontal. The contact pixels also bear arrows representing repulsive pressures.

Calculation of the contact forces at each vertex A to M involves calculating the intersection volume 19 along the three visualization axes. This calculation will only be shown for the vertical projection in FIG. 6. The calculation is identical for the other visualization axes. According to the invention, the volume is calculated from the following formula:

$$V = a \sum_{(i,j) \in C} (-1)^d z_{i,j},$$

In practice, "a" is the area of each contact pixel. i,j provide identification of each contact pixel in FIG. 6. For contact pixel 24 (located on an edge of object 17), for example, the height $z_{i,j}$ associated with this pixel is its height at reference point z as shown in FIG. 6 (ordinate axis parallel to the projection axis); "d" is equal to 1. In contrast, for contact pixel 25 (located on an edge of object 18), the height $z_{i,j}$ associated with this pixel is its height at reference point z as shown in FIG. 6; "d" is equal to 2. For contact pixels 24 and 25, it is understood that calculation of the intersection volume comes down to calculating the volume of the shaded part in FIG. 6. 24 is a lower contact pixel. 25 is an upper contact pixel.

The intersection volume is calculated along a single visualization axis or for each visualization axis, and in the latter case the mean of the three calculated values of intersection volume will be used.

Once the volume has been calculated, the partial derivative of the volume with respect to the height is calculated for each visualization axis and at the level of each vertex A-M; in the example in FIG. 6 it is with respect to the z axis, which is the projection axis. To do this, advantageously the following equation is used:

$$\frac{\partial V}{\partial z} = a \sum_{(i,j) \in C} (-1)^d \frac{\partial z_{i,j}}{\partial z}$$

This formula is therefore applied for each vertex along the three visualization axes.

A gradient vector is thus obtained of the form:

$$\frac{\partial V}{\partial x} = \left( \frac{\partial V}{\partial x_A}, \frac{\partial V}{\partial y_A}, \frac{\partial V}{\partial z_A}, \frac{\partial V}{\partial x_B}, \ldots \right)$$

According to the invention, if a potential energy is defined by:

$$E = \frac{1}{2} k V^2,$$

Then the contact force is:

$$f = -kV \frac{\partial V}{\partial x},$$

k being a positive number.

In fact, it is sufficient to recover the gradient vector calculated previously and multiply by −kV.

The present invention therefore makes it possible calculate contact forces in a simulation of mechanical objects. The simulated objects are provided with contact surfaces that interact when the objects intersect each other. The invention consists of modelling the contact surfaces in the form of height fields sampled in three orthogonal directions, then calculating the derivatives of the intersection volume with respect to the coordinates of the vertices of the triangles in each direction in space, using three LDIs in orthogonal directions. The pressure force acting on a contact surface can then be calculated according to these partial derivatives.

Of course, the invention is not limited to the examples which have just been described and numerous adjustments can be made to these examples without exceeding the scope of the invention.

The invention claimed is:

1. A method for interactive simulation of an intersection between at least two volumetric objects modeled by means of geometric primitives, comprising:
    a) a bounding polyhedron of an intersection volume V between the two objects is determined;
    b) for a visualization axis of the polyhedron, a layered depth image (LDI) algorithm is applied so as to determine a set of contact pixels;
    c) the size of the intersection volume V is calculated from the contact pixels;
    d) at each vertex of the geometric primitives in the polyhedron, a partial derivative of the size of the intersection volume V is calculated with respect to the coordinate of the vertex on the visualization axis;
    e) at least stages b) and d) are repeated for two other orthogonal axes so as to determine partial derivatives in three orthogonal axes; and
    f) a force f calculated from said partial derivatives is associated with each vertex of the geometric primitives of the objects,
    wherein said method is implemented on a graphics processing unit GPU.

2. The method according to claim 1, wherein the partial derivative of the intersection volume for a vertex A on a visualization axis z is defined by the following equation:

$$\frac{\partial V}{\partial z} = a \sum_{(i,j) \in C} (-1)^d \frac{\partial z_{i,j}}{\partial z},$$

"a" being an area of a pixel, "C" is a set of indices of fragments that cover the surface of the intersection volume, $z_{i,j}$ is a height of the contact pixels, "d" is equal to 2 or to 1 for an upper pixel or a lower pixel respectively in a projection according to the LDI algorithm.

3. The method according to claim 1, wherein in stage f), the force is defined by the following equation:

$$f = -\frac{\partial E}{\partial x},$$

E being a potential energy, which is an increasing function of the intersection volume V, and x is a vector of vertex coordinates.

4. The method according to claim 3, wherein the potential energy E is defined by the following equation:

$$E = \frac{1}{2}kV^2, \quad \text{i.e.} \quad f = -kV\frac{\partial V}{\partial x},$$

k being a positive number.

5. The method according to claim 1, wherein in stage c), the intersection volume V is calculated from the following equation:

$$V = a \sum_{(i,j) \in C} (-1)^d z_{i,j},$$

"a" being the area of a pixel, "C" is a set of indices of fragments covering the surface of the intersection volume, $z_{i,j}$ is the height of the contact pixels, "d" is equal to 2 or to 1 for an upper pixel or a lower pixel respectively in the projection according to the LDI algorithm.

6. The method according to claim 1, wherein stage c) is also repeated in stage e), the intersection volume to be considered for the next stages being ⅓ of a value obtained by summing the intersection volume calculated at each repetition.

7. The method according to claim 1, wherein in stage b) each contact pixel is associated with:
   a height value,
   an identifier of the geometric primitive associated with this contact pixel,
   an identifier of the object to which this contact pixel belongs,
   an orientation of the normal to the geometric primitive associated with this contact pixel, and
   barycentric coordinates on the geometric primitive associated with this contact pixel.

8. The method according to claim 1, wherein the geometric primitives are triangular surfaces.

9. The method according to claim 1, wherein the polyhedron is defined as being a volume resulting from the intersection between two bounding boxes of the two objects respectively.

10. The method according to claim 1, wherein for an interactive dynamic simulation, a stiffness matrix is used for encoding the variation of the forces in response to the variation of the positions of the vertices.

11. The method according to claim 10, wherein the stiffness matrix is determined by calculating a differential of the force f.

12. A device for interactive simulation of an intersection between at least two volumetric objects modelled by means of geometric primitives, comprising:
   the graphics processing unit GPU implementing the method according to claim 1.

13. The device according to claim 12, further comprising:
   at least one volume register for storing calculated values of intersection volume, and a gradient register comprising a vector containing three scalar values per vertex, each associated with a visualization axis.

14. The device according to claim 12, further comprising:
   a central processing unit CPU capable of recovering images calculated by the graphics processing unit and for deducing from them the forces to be applied on the two objects.

15. The method according to claim 2, wherein in stage f), the force is defined by the following equation:

$$f = -\frac{\partial E}{\partial x},$$

E being a potential energy, which is an increasing function of the intersection volume V, and x is a vector of vertex coordinates.

16. The device according to claim 13, further comprising:
   a central processing unit CPU capable of recovering images calculated by the graphics processing unit and for deducing from them the forces to be applied on the two objects.

* * * * *